United States Patent
Sakurai et al.

(10) Patent No.: US 9,297,289 B2
(45) Date of Patent: Mar. 29, 2016

(54) EXHAUST GAS PURIFICATION APPARATUS FOR AN INTERNAL COMBUSTION ENGINE

(75) Inventors: Kenji Sakurai, Kyoto (JP); Toru Kidokoro, Hadano (JP); Yasuyuki Irisawa, Susono (JP); Tuyoshi Obuchi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 273 days.

(21) Appl. No.: 14/128,176

(22) PCT Filed: Sep. 6, 2011

(86) PCT No.: PCT/JP2011/070243
§ 371 (c)(1),
(2), (4) Date: Dec. 20, 2013

(87) PCT Pub. No.: WO2013/035155
PCT Pub. Date: Mar. 14, 2013

(65) Prior Publication Data
US 2014/0186220 A1 Jul. 3, 2014

(51) Int. Cl.
*B01D 50/00* (2006.01)
*F01N 3/00* (2006.01)
*F01N 3/20* (2006.01)
*F01N 3/08* (2006.01)
*F01N 11/00* (2006.01)
*F01N 3/10* (2006.01)
*F01N 13/00* (2010.01)

(52) U.S. Cl.
CPC ............ *F01N 3/2053* (2013.01); *F01N 3/0814* (2013.01); *F01N 3/0885* (2013.01); *F01N 3/2066* (2013.01); *F01N 3/2073* (2013.01); *F01N 11/00* (2013.01); *F01N 3/101* (2013.01); *F01N 13/009* (2014.06); *F01N 2430/085* (2013.01); *F01N 2550/02* (2013.01); *F01N 2550/03* (2013.01); *F01N 2560/06* (2013.01); *F01N 2560/14* (2013.01); *F01N 2610/03* (2013.01); *F01N 2900/16* (2013.01); *Y02T 10/22* (2013.01); *Y02T 10/24* (2013.01); *Y02T 10/47* (2013.01)

(58) Field of Classification Search
CPC . F01N 3/101; F01N 2500/03; F01N 2610/03; F01N 3/2053; F01N 3/2066; Y10T 10/24
USPC ............ 422/108, 171, 177; 60/272, 285, 299
See application file for complete search history.

(56) References Cited

U.S. PATENT DOCUMENTS

| | | | |
|---|---|---|---|
| 7,490,464 B2* | 2/2009 | Li | B01D 53/9418 60/274 |
| 2006/0010857 A1* | 1/2006 | Hu | F01N 13/011 60/286 |
| 2006/0153761 A1* | 7/2006 | Bandl-Konrad | F01N 13/011 423/239.1 |

FOREIGN PATENT DOCUMENTS

| | | |
|---|---|---|
| JP | 11 117786 | 4/1999 |
| JP | 2005 105871 | 4/2005 |
| JP | 2008 45479 | 2/2008 |

OTHER PUBLICATIONS

International Search Report Issued Dec. 6, 2011 in PCT/JP11/070243 Filed Sep. 6, 2011.

*Primary Examiner* — Tom P Duong
(74) *Attorney, Agent, or Firm* — Oblon, McClelland, Maier & Neustadt, L.L.P.

(57) ABSTRACT

In cases where an NOx selective reduction catalyst is provided at a location downstream of an NOx storage reduction catalyst, NOx purification performance in an exhaust gas purification apparatus as a whole is maintained, irrespective of deterioration of the NOx storage reduction catalyst. For this purpose, the reduction of NOx in the NOx storage reduction catalyst is promoted more when the degree of deterioration of the NOx storage reduction catalyst or the NOx selective reduction catalyst is low than when it is high, and the reduction of NOx in the NOx selective reduction catalyst is promoted more when the degree of deterioration of the NOx storage reduction catalyst or the NOx selective reduction catalyst is high than when it is low.

4 Claims, 4 Drawing Sheets

EXHAUST GAS PURIFICATION APPARATUS FOR AN INTERNAL COMBUSTION ENGINE

TECHNICAL FIELD

The present invention relates to an exhaust gas purification apparatus for an internal combustion engine.

BACKGROUND ART

There has been known a technique in which disposes an NOx storage reduction catalyst (hereinafter referred to as an NSR catalyst) is disposed in an exhaust passage of an internal combustion engine. This NSR catalyst serves to occlude or store NOx contained in an incoming exhaust gas when the oxygen concentration of the exhaust gas is high, and to reduce the occluded or stored NOx when the oxygen concentration of the incoming exhaust gas becomes low and when a reducing agent exists.

The sulfur oxides (SOx) generated by the combustion of sulfur components included in fuel are occluded or stored by this NSR catalyst, similar to NOx. The SOx stored in this manner is more difficult to be released than NOx, and is accumulated into the NSR catalyst. This is referred to as sulfur poisoning. An NOx purification (i.e., removal and/or reduction) rate in the NSR catalyst is decreased due to this sulfur poisoning, and hence, it is necessary to carry out sulfur poisoning recovery treatment at appropriate times. This sulfur poisoning recovery treatment is carried out by circulating the exhaust gas, of which the oxygen concentration has been made low, through the NSR catalyst, with the temperature of the NSR catalyst being made high.

Here, there has been known a technique in which when the sulfur poisoning of the exhaust gas purification catalyst is recovered by supplying fuel to the exhaust gas purification catalyst in an intermittent manner, the time of supplying the fuel is made longer in accordance with the increasing degree of deterioration of the exhaust gas purification catalyst (for example, refer to a first patent document).

In addition, there has been known a technique in which when the SOx adsorbed or stored in the NOx catalyst is desorbed or released, the operating state of an internal combustion engine is controlled in accordance with the amount of SOx stored in the NOx catalyst which is calculated based on the degree of deterioration of the NOx catalyst (for example, refer to a second patent document).

Moreover, there has also been known a technique in which when the sulfur poisoning of an NOx catalyst is detected which is arranged at a location downstream of a merged portion of a plurality of exhaust passages provided for each group of cylinders in an internal combustion engine, sulfur components are made to release from the NOx catalyst by individually or separately controlling the operations of the individual cylinder groups in the internal combustion engine according to the temperature of an exhaust gas purification catalyst arranged in each of the plurality of exhaust passages, respectively (for example, refer to a third patent document).

However, an NOx selective reduction catalyst (hereinafter also referred to as an SCR catalyst) can be provided at the downstream side of an NSR catalyst. This SCR catalyst is a catalyst which serves to carry out selective reduction of NOx by means of a reducing agent. An NOx purification (removal and/or reduction) rate in this SCR catalyst is affected by the influence of the state of the NSR catalyst. That is, $NH_3$, which becomes the reducing agent for the SCR catalyst in the NSR catalyst, is generated, but the amount of $NH_3$ thus generated changes in accordance with the state of the NSR catalyst.

Here, in this conventional technique, no mention is not made to sulfur poisoning recovery treatment of the NSR catalyst in the case of the SCR catalyst being provided at the downstream side of the NSR catalyst. For this reason, there is a fear that the sulfur poisoning recovery of the NSR catalyst may not be carried out in an appropriate manner. As a result of this, there is also a fear that the purification performance or ability of the SCR catalyst can not be exhibited.

PRIOR ART REFERENCES

Patent Documents

[First Patent Document] Japanese patent application laid-open No. 2005-105871
[Second Patent Document] Japanese patent application laid-open No. 2008-045479
[Third Patent Document] Japanese patent application laid-open No. H11-117786

SUMMARY OF THE INVENTION

Problems to be Solved by the Invention

The present invention has been made in view of the problems as mentioned above, and the object of the invention is to maintain the NOx purification (removal and/or reduction) performance of an exhaust gas purification apparatus as a whole irrespective of deterioration of an NOx storage reduction catalyst, in cases where an NOx selective reduction catalyst is arranged at a location downstream of the NOx storage reduction catalyst.

Means for Solving the Problem

In order to achieve the above-mentioned object, an exhaust gas purification apparatus of an internal combustion engine according to the present invention is provided with:

an NOx storage reduction catalyst that is arranged in an exhaust passage of the internal combustion engine, and serves to store NOx contained in an incoming exhaust gas when an oxygen concentration of the exhaust gas is high, and to reduce the NOx thus stored when the oxygen concentration of the incoming exhaust gas becomes low and when a reducing agent exists;

an NOx selective reduction catalyst that is arranged in the exhaust passage at a location downstream of said NOx storage reduction catalyst, and reduces the NOx in a selective manner;

a detection unit configured to detect a degree of deterioration of said NOx storage reduction catalyst or said NOx selective reduction catalyst; and a control unit configured to promote the reduction of NOx in said NOx storage reduction catalyst more when the degree of deterioration detected by said detection unit is low than when it is high, and promote the reduction of NOx in said NOx selective reduction catalyst more when the degree of deterioration detected by said detection unit is high than when it is low.

The NOx storage reduction catalyst causes $H_2$ or HC to react with NO thereby to generate $NH_3$, for example. This $NH_3$ can be used as the reducing agent in the NOx selective reduction catalyst.

The detection unit may detect the degree of deterioration based on a physical quantity which is in correlation with the degree of deterioration of the NOx storage reduction catalyst or the NOx selective reduction catalyst. In addition, the NOx storage reduction catalyst and the NOx selective reduction catalyst have a correlation with each other with respect to the degree of deterioration thereof, and hence, the degree of deterioration of either one of the catalysts may be detected.

In the control unit, to promote the reduction of NOx can include making it easy to reduce NOx, enhancing the purification (removal and/or reduction) rate of NOx, enhancing NOx purification (removal and/or reduction) ability, or increasing the amount of the supply of the reducing agent.

In addition, the poisoning of the NOx storage reduction catalyst is caused by sulfur components in the exhaust gas. Here, the NOx storage reduction catalyst is deteriorated due to heat or aging, so that the occlusion or storage ability thereof for NOx is decreased. Then, in cases where the degree of deterioration of the NOx storage reduction catalyst due to heat, etc., is low, the NOx occlusion or storage ability thereof is high, so it is easy for the NOx storage reduction catalyst to occlude or store SOx, too. For this reason, sulfur poisoning is easy to occur in the NOx storage reduction catalyst. On the other hand, if the frequency in which sulfur poisoning recovery treatment is carried out is enhanced more when the degree of deterioration is low than when it is high, it is possible to suppress the NOx reduction rate from being decreased in the NOx storage reduction catalyst. That is, the removal or reduction rate of NOx can be enhanced by promoting the reduction of NOx in the NOx storage reduction catalyst more when the degree of deterioration of the NOx storage reduction catalyst is low than when it is high.

Moreover, when the degree of deterioration of the NOx storage reduction catalyst is low, the $NH_3$ generation ability in the NOx storage reduction catalyst is high. As a result of this, there is a fear that an amount of $NH_3$ may be generated more than the amount required in the NOx selective reduction catalyst. However, by suppressing the generation of $NH_3$, it is possible to suppress the amount of $NH_3$ from becoming too much.

On the other hand, the deterioration of the NOx storage reduction catalyst will reduce the SOx occlusion or storage ability thereof, thus making it difficult for sulfur poisoning to occur. Accordingly, it is possible to decrease the frequency of carrying out sulfur poisoning recovery treatment. In addition, the deterioration of the NOx storage reduction catalyst will reduce the NOx occlusion or storage ability thereof, and hence, even if the frequency of carrying out sulfur poisoning recovery treatment is decreased, the amount of NOx capable of being reduced will not change so much. As a result, it is not necessary to promote the reduction of NOx in the NOx storage reduction catalyst.

In addition, the NOx selective reduction catalyst is slow in the progress of deterioration with respect to the NOx storage reduction catalyst. Accordingly, even if the NOx storage reduction catalyst has deteriorated, NOx can be reduced in the NOx selective reduction catalyst. However, when the NOx storage reduction catalyst has deteriorated, the $NH_3$ generation ability thereof is decreased, so the reducing agent supplied to the NOx selective reduction catalyst can also be decreased.

Accordingly, if a larger amount of $NH_3$ is generated in the NOx storage reduction catalyst, the reducing agent can be supplied to the NOx selective reduction catalyst, so that the NOx reduction rate in the NOx selective reduction catalyst can be enhanced. That is, the higher the deterioration of the catalyst becomes, the more the reduction of NOx in the NOx selective reduction catalyst can be promoted. As a result of this, an amount of fall or decrease of the NOx reduction rate in the NOx storage reduction catalyst can be supplemented by an amount of rise or increase of the NOx reduction rate in the NOx selective reduction catalyst, so that it is possible to suppress a decrease in the NOx reduction rate as the entire exhaust gas purification apparatus.

Here, note that said control unit may supply the reducing agent to said NOx storage reduction catalyst and said NOx selective reduction catalyst in such a manner that it becomes more difficult to carry out the reduction of NOx in said NOx storage reduction catalyst, and at the same time it becomes easier to carry out the reduction of NOx in said NOx selective reduction catalyst, in accordance with the higher degree of deterioration detected by said detection unit. In addition, said control unit may promote the reduction of NOx in said NOx storage reduction catalyst more in accordance with the lower degree of deterioration detected by said detection unit, and promote the reduction of NOx in said NOx selective reduction catalyst more in accordance with the higher degree of deterioration detected by said detection unit. Moreover, as the degree of deterioration detected by the detection unit becomes higher, the priority of the reduction of NOx may be made higher in the NOx selective reduction catalyst than in the NOx storage reduction catalyst.

Further, in the present invention, said control unit can make the concentration of NOx in the exhaust gas flowing into said NOx storage reduction catalyst higher in accordance with the higher degree of deterioration detected by said detection unit.

In that case, the amount of generation of $NH_3$ can be made to increase in the NOx storage reduction catalyst. That is, the NOx in the exhaust gas reacts with HC or $H_2$ in the NOx storage reduction catalyst to generate $NH_3$, so that the amount of generation of $NH_3$ can be increased by making the concentration of NOx higher. As a result of this, a larger amount of reducing agent can be supplied to the NOx selective reduction catalyst. Accordingly, the reduction of NOx in the NOx selective reduction catalyst can be promoted. Here, note that the amount of NOx in the exhaust gas flowing into said NOx storage reduction catalyst may be made larger in accordance with the higher degree of deterioration detected by the detection unit.

Furthermore, in the present invention, said control unit can make the frequency of recovering sulfur poisoning of said NOx storage reduction catalyst lower in accordance with the higher degree of deterioration detected by said detection unit.

In that case, deterioration in fuel economy can be suppressed. In this connection, note that when the degree of deterioration of the NOx storage reduction catalyst becomes high, it becomes difficult for SOx to be stored therein, and hence, even if the frequency of carrying out sulfur poisoning recovery processing is decreased, there will be almost no problem. In addition, when the degree of deterioration detected by the detection unit is low, the frequency of carrying out sulfur poisoning recovery treatment is high, so that the reduction of NOx in the NOx storage reduction catalyst can be promoted.

In addition, in the present invention, said control unit can increase an amount of reducing agent to be supplied at the time of reduction of NOx or at the time of generation of $NH_3$ in said NOx storage reduction catalyst in accordance with the higher degree of deterioration detected by said detection unit.

In that case, the amount of generation of $NH_3$ can be made to increase in the NOx storage reduction catalyst. That is, because the NOx in the exhaust gas reacts with HC or $H_2$ in the NOx storage reduction catalyst to generate $NH_3$, it is possible to increase the amount of generation of $NH_3$ by increasing the amount of reducing agent to be supplied. As a result of this, a larger amount of reducing agent can be supplied to the NOx selective reduction catalyst. That is, the reduction of NOx in the NOx selective reduction catalyst can be promoted.

Effect of the Invention

According to the present invention, in cases where an NOx selective reduction catalyst is provided at a location downstream of an NOx storage reduction catalyst, it is possible to maintain the NOx purification performance in an exhaust gas purification apparatus as a whole, irrespective of the deterioration of the NOx storage reduction catalyst.

MODE FOR CARRYING OUT THE INVENTION

Hereinafter, reference will be made to a specific embodiment of an exhaust gas purification apparatus for an internal combustion engine according to the present invention based on the attached drawings.

[First Embodiment]

Figure 1:
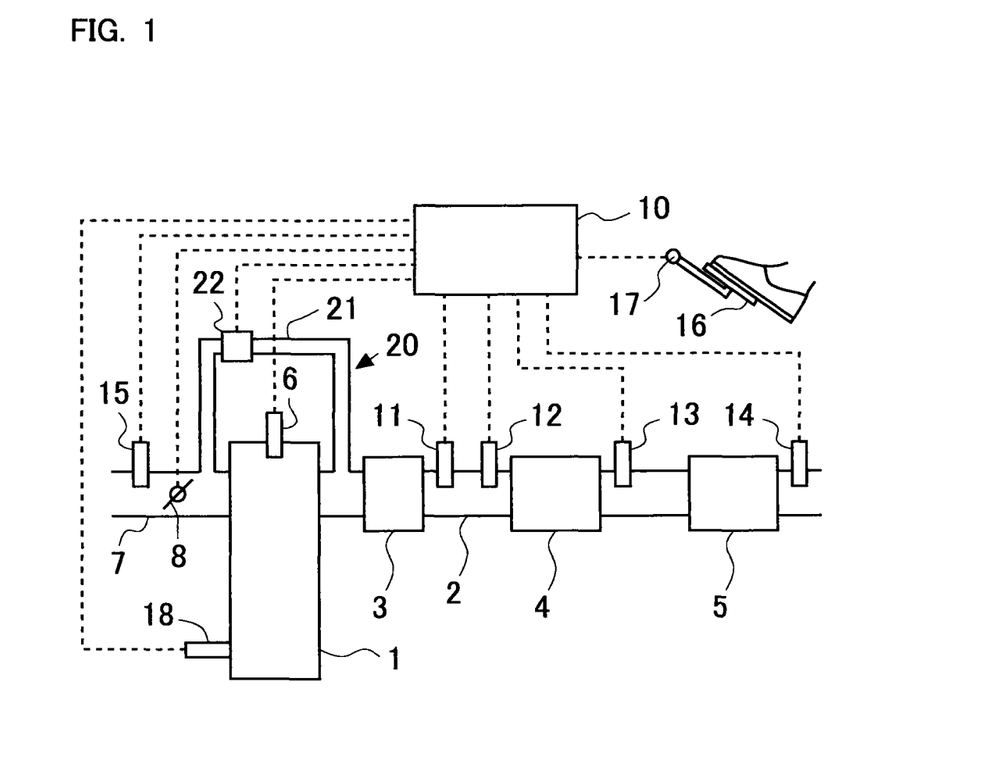
FIG. 1 is a view showing the schematic construction of an internal combustion engine as well as its intake and exhaust systems according to an embodiment of the present invention.

FIG. 1 is a view showing the schematic construction of an internal combustion engine as well as its intake and exhaust systems according to this embodiment of the present invention. An internal combustion engine 1 shown in FIG. 1 is a gasoline engine, but it may be a diesel engine. The internal combustion engine 1 is installed on a vehicle, for example.

An exhaust passage 2 is connected to the internal combustion engine 1. In the middle of the exhaust passage 2, a three-way catalyst 3, an NOx storage reduction catalyst 4 (hereinafter referred to as an NSR catalyst 4) and an NOx selective reduction catalyst 5 (hereinafter referred to as an SCR catalyst 5) are sequentially provided in this order from an upstream side.

The three-way catalyst 3 serves to remove NOx, HC and CO with a maximum efficiency at the time when a catalyst atmosphere is at a stoichiometric air fuel ratio. In addition, the three-way catalyst 3 has oxygen storage ability. That is, when the air fuel ratio of an incoming exhaust gas is a lean air fuel ratio, the three-way catalyst 3 occludes or stores an excess of oxygen, whereas when the air fuel ratio of the incoming exhaust gas is a rich air fuel ratio, the three-way catalyst 3 releases a shortage of oxygen, thereby purifying the exhaust gas.

By the action of such oxygen storage ability, the three-way catalyst 3 can purify or remove HC, CO and NOx, even if the air fuel ratio of the incoming exhaust gas is other than the stoichiometric air fuel ratio. That is, by the action of the oxygen storage ability, it becomes possible to expand the range of the air fuel ratio (also being referred to as a purification window) in which the three-way catalyst 3 can remove HC, CO and NOx at a predetermined ratio or above.

In addition, the NSR catalyst 4 has a function of occluding or storing NOx contained in the incoming exhaust gas when the oxygen concentration of the exhaust gas is high, and of reducing the occluded or stored NOx when the oxygen concentration of the incoming exhaust gas becomes low and when the reducing agent exists. For the reducing agent to be supplied to the NSR catalyst 4, there can be used HC or CO which is the unburnt fuel discharged from the internal combustion engine 1. Here, note that when the exhaust gas passes through the three-way catalyst 3 or the NSR catalyst 4, the NOx in the exhaust gas may react with HC or $H_2$ to generate ammonia ($NH_3$).

The SCR catalyst 5 has a function of adsorbing the reducing agent, and carrying out selection reduction of NOx by means of the reducing agent thus adsorbed at the time when the NOx passes through the SCR catalyst 5. For the reducing agent to be supplied to the SCR catalyst 5, there can be used $NH_3$ generated by the three-way catalyst 3 or the NSR catalyst 4.

Moreover, a first temperature sensor 11 for detecting the temperature of the exhaust gas and an air fuel ratio sensor 12 for detecting the air fuel ratio of the exhaust gas are mounted on the exhaust passage 2 at locations downstream of the three-way catalyst 3 and upstream of the NSR catalyst 4. Here, note that the temperature of the three-way catalyst 3 or the temperature of the NSR catalyst 4 can be measured by the first temperature sensor 11. Also, the air fuel ratio of the exhaust gas in the internal combustion engine 1 or the air fuel ratio of the exhaust gas flowing into the NSR catalyst 4 can be detected by the air fuel ratio sensor 12.

Further, a second temperature sensor 13 for detecting the temperature of the exhaust gas is mounted on the exhaust passage 2 at a location downstream of the NSR catalyst 4 and upstream of the SCR catalyst 5. Here, note that the temperature of the NSR catalyst 4 or the temperature of the SCR catalyst 5 can be detected by the second temperature sensor 13.

Furthermore, a third temperature sensor 14 for detecting the temperature of the exhaust gas is mounted on the exhaust passage 2 at a location downstream of the SCR catalyst 5. Here, note that the temperature of the SCR catalyst 5 can be detected by the third temperature sensor 14.

Note that it is not necessary to mount all the above-mentioned sensors, but some of them may be selected and mounted in a suitable manner.

In addition, on the internal combustion engine 1, there is mounted a fuel injection valve 6 for supplying fuel to the internal combustion engine 1.

On the other hand, an intake passage 7 is connected to the internal combustion engine 1. A throttle valve 8 for regulating an amount of intake air in the internal combustion engine 1 is arranged in the middle of the intake passage 7. Also, an air flow meter 15 for detecting the amount of intake air in the internal combustion engine 1 is mounted on the intake passage 7 at a location upstream of the throttle valve 8.

Moreover, an EGR device 20 is provided on the internal combustion engine 1. The EGR device 20 is constructed to be provided with an EGR passage 21 and an EGR valve 22. The EGR passage 21 serves to connect between the exhaust passage 2 upstream of the three-way catalyst 3 and the intake passage 7 downstream of the throttle valve 8. The EGR valve 22 regulates the amount of the EGR gas to be supplied to the internal combustion engine 1 by regulating the cross sectional area of the EGR passage 21.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

Further, besides the above-mentioned sensors, an accelerator opening sensor 17, which serves to detect an engine load by outputting an electrical signal corresponding to an amount by which a driver depressed an accelerator pedal 16, and a crank position sensor 18, which serves to detect the number of revolutions per minute of the engine, are connected to the ECU 10 through electrical wiring, and the output signals of these variety of kinds of sensors are inputted to the ECU 10.

On the other hand, the injection valve 6, the throttle valve 8 and the EGR valve 22 are connected to the ECU 10 through electrical wiring, so that the opening and closing timing of the injection valve 6, the degree of opening of the throttle valve 8 and the degree of opening of the EGR valve 22 are controlled by means of the ECU 10.

For example, the ECU 10 decides the required amount of intake air from the accelerator opening degree detected by the accelerator opening sensor 17, and the number of engine revolutions per unit time detected by the crank position sensor 18. Then, the degree of opening of the throttle valve 8 is controlled so as to achieve the required amount of intake air. The injection valve 6 is controlled in such a manner as to supply an amount of fuel injection in accordance with the amount of intake air which changes at this time. The air fuel ratio set at this time is 25, for example, and hereinafter is referred to as an ordinary air fuel ratio. This ordinary air fuel ratio is an air fuel ratio which is set according to the operating state of the internal combustion engine 1. The internal combustion engine 1 according to this embodiment is driven in a lean burn operation at times other than during a rich spike period and a sulfur poisoning recovery period, and so, the ordinary air fuel ratio is a lean air fuel ratio.

In addition, the ECU 10 carries out a reduction treatment for the NOx stored in the NSR catalyst 4. At the time of reducing the NOx stored in the NSR catalyst 4, so-called rich spike control is carried out in which the air fuel ratio of the exhaust gas flowing into the NSR catalyst 4 is caused to decrease to a predetermined rich air fuel ratio by regulating the amount of fuel to be injected from the injection valve 6 or the degree of opening of the throttle valve 8.

This rich spike control is carried out in cases where the amount of NOx stored in the NSR catalyst 4 becomes a predetermined amount. The amount of NOx stored in the NSR catalyst 4 is calculated, for example, by integrating a difference between the amount of NOx flowing into the NSR catalyst 4 and the amount of NOx flowing out of the NSR catalyst 4. The amount of NOx flowing into the NSR catalyst 4 and the amount of NOx flowing out of the NSR catalyst 4 can be detected by provision of sensors. In addition, the rich spike control may be carried out at every predetermined period of time or at every predetermined distance of travel.

Further, in order to recover the NSR catalyst 4 from sulfur poisoning, the ECU 10 carries out sulfur poisoning recovery treatment for the NSR catalyst 4. This sulfur poisoning recovery treatment is carried out by controlling the air fuel ratio of the exhaust gas to a predetermined rich air fuel ratio (e.g., 25), after raising the temperature of the NSR catalyst 4 to a temperature (e.g., 650 degrees C. or above) which is required for sulfur poisoning recovery. Here, note that when the temperature of the NSR catalyst 4 is caused to rise, the amount of fuel to be injected from the injection valve 6 or the degree of opening of the throttle valve 8 may be decided in such a manner that the air fuel ratio of the exhaust gas becomes a lean air fuel ratio.

Here, note that, the air fuel ratio at the time of sulfur poisoning recovery and the air fuel ratio at the time of NOx reduction (at the time of rich spike control) may be the same value, or may be different values. In addition, the air fuel ratio at the time of rich spike control may also be a value which is equal to or less than the stoichiometric air fuel ratio, and is higher than 14.3. Here, note that the air fuel ratio at the time of sulfur poisoning recovery and the air fuel ratio at the time of NOx reduction (at the time of rich spike control) are set to be air fuel ratios within the purification window of the three-way catalyst 3. Then, the sulfur poisoning recovery treatment is carried out for 10 minutes, for example. This period of time is set in advance as a period of time until the sulfur poisoning recovery treatment is completed. Here, note that it is not necessary to cause all the sulfur components to be released from the NSR catalyst 4.

Then, after the sulfur poisoning recovery treatment is completed, the air fuel ratio of the exhaust gas is restored to the ordinary air fuel ratio. The word "ordinary" means the time in which rich spike or sulfur poisoning recovery control is not carried out. In addition, as described above, the ordinary air fuel ratio is an air fuel ratio which is set according to the operating state of the internal combustion engine 1, and is an air fuel ratio when rich spike control or sulfur poisoning recovery control is not carried out.

That is, the ECU 10 sets the air fuel ratio to 25, when not carrying out sulfur poisoning recovery or NOx reduction, and sets the air fuel ratio rich at the time of sulfur poisoning recovery or NOx reduction. Here, note that at the time of the sulfur poisoning recovery of the NSR catalyst 4, the ECU 10 controls the injection valve 6 or the throttle valve 8 in such a manner that the internal combustion engine 1 is driven to operate at a rich air fuel ratio of 14.3.

However, in cases where the SCR catalyst 5 is provided at the downstream side of the NSR catalyst 4, even when the sulfur poisoning of the NSR catalyst 4 has occurred, NOx may be able to be reduced by means of the SCR catalyst 5. For this reason, a decrease in the NOx reduction rate as the entire exhaust gas purification apparatus is smaller than in the case where the SCR catalyst 5 is not provided. Here, even if sulfur poisoning occurs in the NSR catalyst 4, $NH_3$, which is generated by the reaction of NOx and the reducing agent in the NSR catalyst 4, is used as the reducing agent in the SCR catalyst 5. However, it has been turned out that when sulfur poisoning occurs in the NSR catalyst 4, not only the NOx occlusion or storage ability is reduced, but the $NH_3$ generation ability is also reduced. In addition, in cases where the deterioration of the NSR catalyst 4 progresses, too, the $NH_3$ generation ability thereof is reduced. This deterioration is thermal deterioration or aged deterioration, for example. Accordingly, there is a fear that the NOx reduction rate in the SCR catalyst 5 may also be reduced due to the sulfur poisoning or deterioration of the NSR catalyst 4.

Here, in an exhaust gas purification apparatus which is provided with only the NSR catalyst 4 and is not provided with the SCR catalyst 5 at a location downstream of the NSR catalyst 4, as in conventional ones, sulfur poisoning recovery treatment has been carried out, for example, each time the vehicle on which the internal combustion engine 1 is mounted has traveled a preset distance (e.g., 2,000 km). This is also the same as in the case where a plurality of NSR catalysts are arranged in series with respect to one another.

Moreover, in an exhaust gas purification apparatus which is provided with only the NSR catalyst 4 and is not provided with the SCR catalyst 5 at a location downstream of the NSR catalyst 4, as in conventional ones, it has been considered that the more the deterioration of the NSR catalyst 4 progresses, the higher it is necessary to enhance the frequency of carrying out sulfur poisoning recovery treatment. That is, the more the deterioration of the NSR catalyst 4 progresses, the more the NOx removal or reduction rate decreases, and hence, it has been tried to make the decrease of the NOx removal or reduction rate due to the sulfur poisoning as small as possible.

Further, in the past, it has been considered that the NOx purification (removal or reduction) performance is decreased in accordance with the progress of the deterioration of the NSR catalyst 4, so it is necessary to decrease the amount of NOx flowing into the NSR catalyst 4. That is, it has been considered that the amount of NOx, which is able to be removed or reduced, is decreased due to the decrease of the NOx purification (removal or reduction) performance, in accordance with which it is necessary to limit the inflow amount of NOx. Similarly, it has been considered that the amount of the reducing agent which is able to react with NOx is decreased in accordance with the progress of the deterioration of the NOx catalyst 4, and so it is necessary to decrease the amount of the supply of the reducing agent.

However, in cases where sulfur poisoning has occurred in the NSR catalyst 4, or in cases where the degree of the deterioration of the NSR catalyst 4 becomes high, the $NH_3$ generation ability thereof is reduced. In such a case, when the sulfur poisoning recovery treatment of the NSR catalyst 4 is carried out as conventionally, or when the inflow amount of NOx to the NSR catalyst 4 is limited, there will be a fear that the NOx removal or reduction rate in the SCR catalyst 5 may also be reduced.

Here, in cases where the NSR catalyst 4 is a new article or in cases where it is near to a new article, the occlusive material (e.g., a base such as Ba) which constitutes the NSR catalyst 4 has not deteriorated, and hence, the NOx storage ability thereof is high. However, SOx as well as NOx will be occluded or stored by the NSR catalyst 4, so it is easy to generate sulfur poisoning. Accordingly, it is preferable that in cases where the NSR catalyst 4 is a new article, or in cases where it is near to a new article, the frequency of carrying out sulfur poisoning recovery treatment be relatively high. That is, by making the frequency of carrying out sulfur poisoning recovery treatment relatively high, it is possible to suppress the decrease of the NOx removal or reduction rate in the NSR catalyst 4, so that the NOx removal or reduction rate as the entire exhaust gas purification apparatus becomes high.

In addition, in cases where the NSR catalyst 4 is a new article or in cases where it is near to a new article, the NSR catalyst 4 has not deteriorated, and hence, the $NH_3$ generation ability thereof is high. However, there is a fear that an amount of $NH_3$ may be generated more than the amount required by the SCR catalyst 5. That is, there is a fear that $NH_3$ may be generated excessively in the NSR catalyst 4. In order to suppress this, it is preferable to reduce the amount of NOx flowing into the NSR catalyst 4. That is, it is preferable to reduce the amount of NOx to be discharged from the internal combustion engine 1.

On the other hand, when the deterioration of the NSR catalyst 4 progresses, the occlusion or storage of SOx will be suppressed by the reduction of the occlusion or storage ability thereof. That is, SOx becomes difficult to be occluded or stored by the NSR catalyst 4, so it becomes difficult for the sulfur poisoning thereof to occur. In addition, even if sulfur poisoning recovery treatment is carried out, there will be a relatively small amount of NOx which is able to be occluded or stored. That is, the effect of carrying out sulfur poisoning recovery treatment becomes smaller in accordance with the progress of the deterioration of the NSR catalyst 4. In contrast to this, if the frequency of carrying out sulfur poisoning recovery treatment is made relatively low, it will be possible to suppress the deterioration in fuel economy.

Moreover, as the deterioration of the NSR catalyst 4 progresses, the $NH_3$ generation ability thereof is also reduced. Accordingly, there is a fear that the amount of $NH_3$ to be supplied to the SCR catalyst 5 may be decreased. On the other hand, if control is carried out so as to make it easy for $NH_3$ to be generated by the NSR catalyst 4, it is possible to suppress the decrease of $NH_3$ to be supplied to the SCR catalyst 5. For example, $NH_3$ becomes easy to be generated, by increasing the amount of NOx flowing into the NSR catalyst 4, or increasing the amount of the reducing agent to be supplied to the NSR catalyst 4.

Here, the NSR catalyst 4 becomes high temperature at the time of sulfur poisoning recovery treatment, so it is deteriorated easily. On the other hand, the SCR catalyst 5, being provided at a location away from the NSR catalyst 4, can not be easily affected by the influence of the temperature at the time of the sulfur poisoning recovery, so the progress of deterioration thereof is slow, as compared with the NSR catalyst 4. For this reason, even if the NOx removal or reduction rate in the NSR catalyst 4 is reduced by its deterioration, the NOx removal or reduction rate in the SCR catalyst 5 is relatively high. Accordingly, if the removal or reduction of NOx in the SCR catalyst 5 is promoted at the time when the deterioration of the NSR catalyst 4 has progressed, an amount of fall or decrease of the NOx removal or reduction rate in the NSR catalyst 4 can be supplemented by an amount of rise or increase of the NOx removal or reduction rate in the SCR catalyst 5.

That is, in the past, the frequency of carrying out sulfur poisoning recovery treatment has been made higher in accordance with the progress of the deterioration of the NSR catalyst 4, but in this embodiment, the frequency of carrying out sulfur poisoning recovery treatment is made lower in accordance with the progress of the deterioration of the NSR catalyst 4. Also, in the past, the amount of reducing agent or the amount of NOx flowing into the NSR catalyst 4 has been made smaller in accordance with the progress of the deterioration of the NSR catalyst 4, but in this embodiment, the amount of reducing agent or the amount of NOx flowing into the NSR catalyst 4 is made larger in accordance with the progress of the deterioration of the NSR catalyst 4. In this manner, in accordance with the progress of the deterioration of the NSR catalyst 4, a shift is made from the reduction of NOx by means of the NSR catalyst 4 to the reduction of NOx by means of the SCR catalyst 5.

Figure 2:
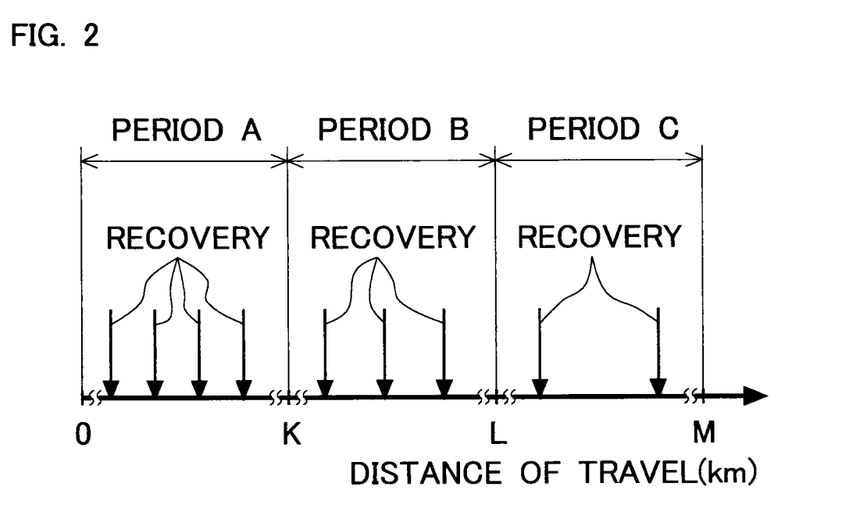
FIG. 2 is a view showing the relation between the mileage (distance of travel) of a vehicle on which the internal combustion engine is mounted, and the time at which sulfur poisoning recovery treatment is carried out.

FIG. 2 is a view showing the relation between the mileage (distance of travel) of the vehicle on which the internal combustion engine 1 is mounted, and the time at which sulfur poisoning recovery treatment is carried out. An axis of abscissa represents the mileage or distance of travel. In addition, arrows denoted by "recovery" each indicate a point in time at which sulfur poisoning recovery treatment is carried out. When the mileage is 0, the NSR catalyst 4 is a new article.

In a range in which the distance of travel is from 0 to K (hereinafter referred to as a period A), it is assumed that the NSR catalyst 4 has almost not deteriorated, and sulfur poisoning recovery treatment is carried out at every travel distance of 800 km. Here, note that an EGR rate at this time is assumed to be 15%, and a concentration of the NOx flowing into the NSR catalyst 4 is assumed to be 40 ppm. The EGR ratio is a ratio of the mass of an EGR gas to the mass of the whole gas sucked into each cylinder of the internal combustion engine 1. The EGR rate can be changed by regulating at least one of the degree of opening of the EGR valve 22 and the degree of opening of the throttle valve 8. The relation between the degree of opening of the EGR valve 22 or the degree of opening of the throttle valve 8 and the EGR rate can be obtained in advance through experiments, etc., and can also be stored in the ECU 10. In addition, the degree of opening of the EGR valve 22 may be controlled in a feedback manner so that the amount of intake air becomes a target value.

In addition, in a range in which the distance of travel is from K to L (hereinafter referred to also as a period of time B), it is assumed that the deterioration of the NSR catalyst 4 has progressed to some extent, and sulfur poisoning recovery treatment is carried out at every travel distance of 1,000 km. The EGR rate at this time is set as 10%, for example, and the concentration of the NOx flowing into the NSR catalyst 4 at this time is set as 70 ppm, for example.

Moreover, in a range in which the distance of travel is from L to M (hereinafter referred to also as a period of time C), it is assumed that the deterioration of the NSR catalyst 4 has progressed to a further extent, and sulfur poisoning recovery treatment is carried out at every travel distance of 2,000 km. The EGR rate at this time is set as 5%, for example, and the concentration of the NOx flowing into the NSR catalyst 4 at this time is set as 100 ppm, for example.

In this manner, the longer the total distance of travel, the longer is made the distance of travel at which sulfur poisoning recovery treatment is carried out. As a result of this, the frequency of carrying out sulfur poisoning recovery treatment becomes lower in accordance with the increasing deterioration of the NSR catalyst 4. Here, note that optimal relations between the distances of travel K, L, M and the frequencies in which sulfur poisoning recovery treatment is carried out in FIG. 2 can be obtained through experiments, etc.

However, when the EGR rate is made lower as the distance of travel increases, pumping loss will increase, so there will be a fear that fuel economy may be deteriorated. However, in this embodiment, the frequency of carrying out sulfur poisoning recovery treatment is made lower as the distance of travel increases, so that the deterioration in fuel economy can be suppressed. Then, in the period A, the period B, and the period C, respectively, if an amount of deterioration in fuel economy caused by carrying out sulfur poisoning recovery treatment and an amount of improvement in fuel economy caused by supplying the EGR gas are equal to each other, the amount of deterioration and the amount of improvement in fuel economy will be offset with each other in each of the periods.

In addition, when a difference between the amount of deterioration in fuel economy by carrying out sulfur poisoning recovery treatment and the amount of improvement in fuel economy by supplying the EGR gas is altogether equal in the period A, the period B, and the period C, respectively, it is possible to suppress a change in fuel economy even if a change is made from the period A to the period B, or from the period B to the period C. In that case, it becomes difficult for a user to notice that the frequency of carrying out sulfur poisoning recovery treatment and the EGR rate have been changed in accordance with the distance of travel, as a result of which it is possible to suppress the user from feeling a sense of discomfort.

Here, note that in this embodiment, the frequency of carrying out sulfur poisoning recovery treatment and the EGR rate are changed in a stepwise manner in the period A, the period B and the period C, respectively, but instead of this, the frequency of carrying out sulfur poisoning recovery treatment and the EGR rate may be changed in a stepless manner according to the distance of travel of the vehicle. That is, the frequency of carrying out sulfur poisoning recovery treatment may be made lower, and the EGR rate may also be made lower, in accordance with the increasing distance of travel.

Figure 3:
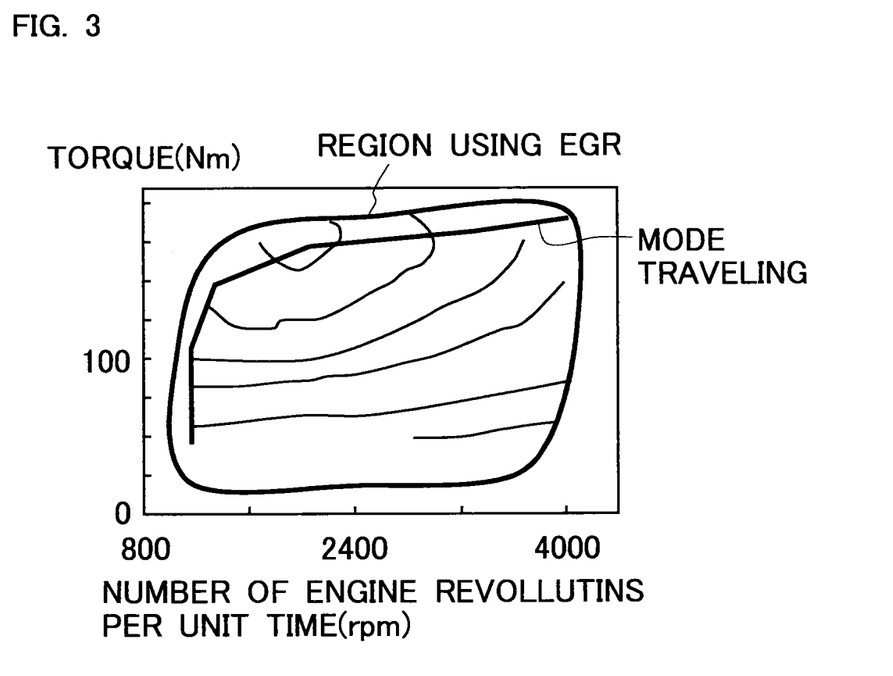
FIG. 3 is a view showing an operation region in which an EGR gas is supplied when an NSR catalyst is new.
Figure 4:
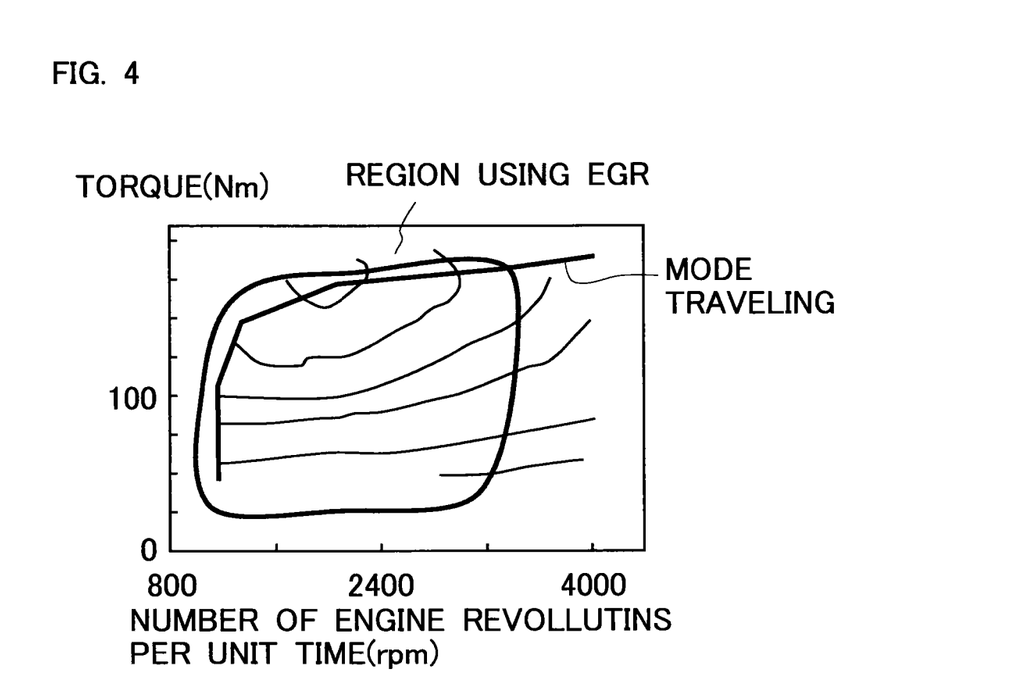
FIG. 4 is a view showing an operation region in which the EGR gas is supplied when the NSR catalyst has deteriorated.

Here, FIG. 3 is a view showing an operation region in which the EGR gas is supplied when the NSR catalyst 4 is new. Also, FIG. 4 is a view showing an operation region in which the EGR gas is supplied when the NSR catalyst 4 has deteriorated. In FIGS. 3 and 4, the axis of abscissa represents the engine revolution number per unit time, and the axis of ordinate represents the shaft torque of the internal combustion engine 1. The EGR gas is supplied in a region which is surrounded by a line indicated by a "region using EGR". Here, note that a line indicated by "mode traveling" represents the number of engine revolutions per unit time and the torque at the time of mode traveling.

In this manner, when the NSR catalyst 4 has deteriorated, the operation region in which the EGR gas is supplied is narrower as compared with the time when it is new. In that case, the amount of NOx discharged from the internal combustion engine 1 increases when the NSR catalyst 4 has deteriorated, so the generation of $NH_3$ can be promoted in the NSR catalyst 4.

Similarly, the relation among the number of engine revolutions per unit time, the torque and the EGR rate may be set in such a manner that the EGR rate becomes lower when the NSR catalyst 4 has deteriorated than when it is new. In that case, the amount of NOx discharged from the internal combustion engine 1 increases when the NSR catalyst 4 has deteriorated, so the generation of $NH_3$ can be promoted in the NSR catalyst 4.

Moreover, the generation of $NH_3$ may be promoted by increasing the amount of the reducing agent flowing into the NSR catalyst 4. Here, because $NH_3$ is generated by the reaction of the NOx discharged from the internal combustion engine 1 with HC or $H_2$, which is the reducing agent, it is possible to increase the amount of generation of $NH_3$ by increasing at least one of the NOx and the reducing agent. Here, note that it is possible to increase the amount of the reducing agent by making the air fuel ratio lower. In addition, for example, by changing ignition timing or valve timing, the amount of NOx flowing into the NSR catalyst 4 or the amount of the reducing agent can also be increased.

Figure 5:
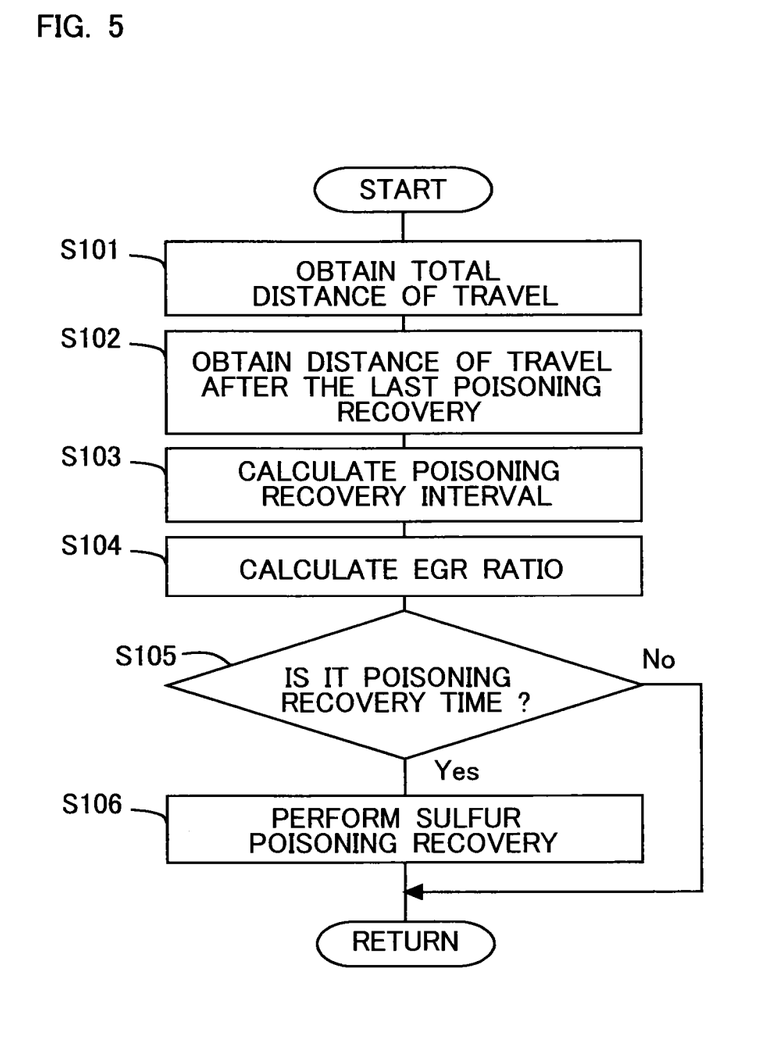
FIG. 5 is a flow chart showing a flow for sulfur poisoning recovery treatment according to the embodiment.

Next, FIG. 5 is a flow chart showing a flow or routine for sulfur poisoning recovery treatment according to this embodiment. This routine is carried out by means of the ECU 10 at each predetermined time interval.

In step S101, a total distance of travel of the vehicle with the internal combustion engine 1 mounted thereon is obtained. This total distance of travel is a distance in which the vehicle with the internal combustion engine 1 mounted thereon has traveled from when it was new. This total distance of travel is used as a physical quantity which is in correlation with the deterioration of the NSR catalyst 4 and the SCR catalyst 5. In this connection, note that other physical quantities may be used which are in correlation with the deterioration of the NSR catalyst 4. For example, the deterioration of the NSR catalyst 4 may be estimated based on the temperature history of the NSR catalyst 4. The total distance of travel has been stored in the ECU 10, for example. Here, note that in this embodiment, the ECU 10, which carries out the processing of step S101, corresponds to a detection unit in the present invention.

In step S102, the distance of travel after the last sulfur poisoning recovery treatment was carried out is obtained. This distance of travel is used as a physical quantity which is in correlation with the degree of sulfur poisoning of the NSR catalyst 4. In this connection, note that other physical quantities may be used which are in correlation with the degree of sulfur poisoning of the NSR catalyst 4. For example, the degree of sulfur poisoning of the NSR catalyst 4 may be estimated by estimating the amount of SOx stored in the NSR catalyst 4 based on the operating state of the internal combustion engine 1 or the concentration of sulfur components in fuel.

In step S103, an interval at which the sulfur poisoning recovery treatment is carried out is calculated. This interval is calculated as a distance of travel after the last sulfur poisoning recovery treatment was carried out until the following sulfur poisoning recovery treatment is carried out. This interval is calculated based on the total distance of travel obtained in step S101. The relation between the total distance of travel and the interval at which the sulfur poisoning recovery treatment is carried out has been beforehand obtained through experiments, etc., and stored in the ECU 10.

In step S104, the EGR rate is calculated. This EGR rate is calculated based on the total distance of travel or the interval at which the sulfur poisoning recovery treatment is carried out. This relation has been beforehand obtained through experiments, etc., and stored in the ECU 10. Then, the throttle 8, the EGR valve 22 or the like is controlled so as to achieve this EGR rate. As a result of this, an amount of NOx corresponding to the degree of the deterioration of the NSR catalyst 4 is discharged from the internal combustion engine 1. That is, NOx is made to be discharged from the internal combustion engine 1 in accordance with a required amount of $NH_3$ to be supplied to the SCR catalyst 5.

Here, note that in step S104, the amount of the reducing agent to be supplied to the NSR catalyst 4 may be increased in accordance with the total distance of travel at the time of the reduction of the NOx stored in the NSR catalyst 4, or at the time of the generation of $NH_3$ which is to be supplied to the SCR catalyst 5. That is, $NH_3$ is generated by the reaction of NOx with the reducing agent (HC or $H_2$). For this reason, the amount of generation of $NH_3$ can be made to increase, even by decreasing the EGR rate to increase the amount of emission of NOx, and/or even by increasing the amount of the supply of the reducing agent. That is, at least one of the increase in the amount of emission of NOx and the increase in the amount of the supply of the reducing agent should only be carried out.

Then, in this embodiment, the ECU 10, which processes the step S102 and the step S103, corresponds to a control unit in the present invention.

In step S105, it is determined whether it is the time to carry out the sulfur poisoning recovery treatment. Specifically, it is determined whether the distance of travel calculated in step S102 has reached the interval calculated in step S103. Here, note that it may be determined whether the amount of SOx stored in the NSR catalyst 4 has become equal to or greater than a threshold value. This amount of SOx may be estimated by means of well-known techniques.

In cases where an affirmative determination is made in step S105, the routine proceeds to step S106, where the sulfur poisoning recovery treatment of the NSR catalyst 4 is carried out. Then, when the time elapsed after the sulfur poisoning recovery treatment of the NSR catalyst 4 was started becomes equal to or greater than a prescribed period of time, the sulfur poisoning recovery treatment of the NSR catalyst 4 will be ended. After that, by making the air fuel ratio rich, $NH_3$ can be generated by the NSR catalyst 4. Here, note that at this time, $NH_3$ is generated by the three-way catalyst 3, too.

On the other hand, in cases where a negative determination is made in step S105, this routine is ended.

As described above, according to this embodiment, by carrying out the sulfur poisoning recovery treatment of the NSR catalyst 4, the $NH_3$ generation ability can also be recovered, and hence, the reducing agent can be supplied to the SCR catalyst 5. Then, by making lower the frequency of carrying out the sulfur poisoning recovery processing and by making larger the amount of NOx flowing into the NSR catalyst 4, in accordance with the decreasing NOx reduction performance of the NSR catalyst 4, it is possible to promote the reduction of NOx by means of the SCR catalyst 5, as a result of which it is possible to suppress a decrease in the NOx reduction rate as the entire exhaust gas purification apparatus.

In addition, the deterioration in fuel economy due to the sulfur poisoning recovery treatment and the improvement in fuel economy due to the supply of the EGR gas can be offset with each other.

Thus, according to this embodiment, the sulfur poisoning of the NSR catalyst 4 can be recovered in an appropriate manner.

EXPLANATION OF REFERENCE NUMERALS AND CHARACTERS

1 internal combustion engine
2 exhaust passage
3 three-way catalyst
4 NOx storage reduction catalyst (NSR catalyst)
5 NOx selective reduction catalyst (SCR catalyst)
6 injection valve
7 intake passage
8 throttle valve
10 ECU
11 first temperature sensor
12 air fuel ratio sensor
13 second temperature sensor
14 third temperature sensor
15 air flow meter
16 accelerator pedal
17 accelerator opening sensor
18 crank position sensor
20 EGR device
21 EGR passage
22 EGR valve

The invention claimed is:

1. An exhaust gas purification apparatus for an internal combustion engine comprising:
    an NOx storage reduction catalyst that is arranged in an exhaust passage of the internal combustion engine, and serves to store NOx contained in an incoming exhaust gas when an oxygen concentration of an exhaust gas is high, and to reduce the NOx thus stored when the oxygen concentration of the incoming exhaust gas becomes low and when a reducing agent exists;
    an NOx selective reduction catalyst that is arranged in the exhaust passage at a location downstream of said NOx storage reduction catalyst, and reduces the NOx in a selective manner;
    a detection unit configured to detect a degree of deterioration of said NOx storage reduction catalyst or said NOx selective reduction catalyst; and
    a control unit configured to promote the reduction of NOx in said NOx storage reduction catalyst more when the degree of deterioration detected by said detection unit is low than when it is high, and promote the reduction of NOx in said NOx selective reduction catalyst more when the degree of deterioration detected by said detection unit is high than when it is low.

2. The exhaust gas purification apparatus for an internal combustion engine as set forth in claim 1, wherein
    said control unit makes a concentration of NOx in the exhaust gas flowing into said NOx storage reduction catalyst higher in accordance with the higher degree of deterioration detected by said detection unit.

3. The exhaust gas purification apparatus for an internal combustion engine as set forth in claim 1, wherein
said control unit makes a frequency of recovering sulfur poisoning of said NOx storage reduction catalyst lower in accordance with the higher degree of deterioration detected by said detection unit.

4. The exhaust gas purification apparatus for an internal combustion engine as set forth in claim 1, wherein
said control unit increases an amount of reducing agent to be supplied at the time of reduction of NOx or at the time of generation of $NH_3$ in said NOx storage reduction catalyst in accordance with the higher degree of deterioration detected by said detection unit.

\* \* \* \* \*